United States Patent [19]
Housel

[11] Patent Number: 5,633,990
[45] Date of Patent: May 27, 1997

[54] METHOD OF NON-OVERLAPPING COLOR PRINTING

[75] Inventor: Edward M. Housel, Rochester, N.Y.

[73] Assignee: Eastman Kodak Company, Rochester, N.Y.

[21] Appl. No.: 631,768

[22] Filed: Apr. 10, 1996

[51] Int. Cl.$^6$ .................................. H04N 1/50; H04N 1/52
[52] U.S. Cl. ............................ 395/109; 358/501; 358/534
[58] Field of Search ............................ 395/109; 358/501, 358/534, 535, 536, 518, 521, 529

[56] References Cited

U.S. PATENT DOCUMENTS

4,614,967  9/1986  Sayanagi .................................. 358/529

*Primary Examiner*—Scott A. Rogers
*Attorney, Agent, or Firm*—Thomas H. Close

[57] ABSTRACT

A multi color printing method employing a color printer capable of non-overlapping color printing using M colorants, where M is greater than two, includes the steps of: providing a digital color image having multi-bit color pixels; separating the digital color image into three multi-bit color primary components; converting each multi-bit component into a 1-bit component using a digital halftoning technique; assigning a single printer colorant to each output image pixel based on the 1-bit color components. The printer colorants are assigned by: dividing the image into n-tuples, each pixel in an n-tuple having a unique designation N; assigning N-member combinations of N−1 printer colorants and no colorant that appear as combinations of 1-bit color components; and setting an output to the Nth member of an N-member combination based on the corresponding combination of 1-bit color components. The image is then printed using the assigned colorants.

7 Claims, 4 Drawing Sheets

METHOD OF NON-OVERLAPPING COLOR PRINTING

The disclosure in the appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to printing systems for printing color documents. More specifically, to such printing systems having the capability of printing non-overlapping colors.

BACKGROUND OF THE INVENTION

Color marking engines capable of printing non-overlapping additive colorants (red, green, blue), such as the Kodak ImageSource 70 C/P electrophotographic color printer are known. Previously such color marking engines have not been used to print multicolor images such as photographs because the printers were not believed capable of producing commercially acceptable image quality. They were used as accent color printers which could produce only a limited number of colors.

Normally color printers employ cyan, magenta, yellow and black to produce color prints. By overlaying these colorants, it is possible to make most colors. These printers are often called process color printers.

Accent color printers can place several colorants on the page. Since they cannot overlay colorants, they can only make colors which are shades of the available colorants plus white if the print receiving medium is white, or the underlying color of the print receiving medium if it is not white. Accent color printers are typically cheaper to manufacture than process color printers.

From the forgoing, it can be seen that it would be advantageous to have a method of extending the gamut of colors printable by an accent color printer, and in the event that the color printer is supplied with a set of three primary colorants, for printing most of the colors currently printable with process color printers.

SUMMARY OF THE INVENTION

The present invention is directed to overcoming one or more of the problems set forth above. Briefly summarized, according to one aspect of the present invention, a multi color printing method employing a color printer capable of non-overlapping color printing using M colorants, where M is greater than two, includes the steps of: providing a digital color image having multi-bit color pixels; separating the digital color image into three multi-bit color primary components; converting each multi-bit component into a 1-bit component using a digital halftoning technique; assigning a single printer colorant to each output image pixel based on the 1-bit color components. The printer colorants are assigned by: dividing the image into n-tuples, each pixel in an n-tuple having a unique designation N; assigning N-member combinations of N−1 printer colorants and no colorant that appear as combinations of 1-bit color components; and setting an output to the Nth member of an N-member combination based on the corresponding combination of 1-bit color components. The image is then printed using the assigned colorants.

One of the main advantages of the present invention over the prior art is that the user can print almost all colors on an accent color printer. There is no need to modify any description of the full color digital image, making the method independent of the page description language used. Since the method can produce most colors, there is no need to have a user specify color re-mapping (i.e. red digital image color to green printed color) as is presently required in accent color printers. According to another aspect of the invention, when a particular additive primary color is missing from an image, the corresponding colorant for that color need not be printed, thereby using only the minimum number of colorants needed for any given printed page. This provides an advantage over process color printers in printing speed.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The present invention employs the general principle that the apparent color of neighboring differently colored pixels when viewed from a sufficient distance will appear as a different color that is the combination of the different colors of the neighboring pixels. The invention employs the technique of converting a multi-bit digital color image to 1-bit color components using any halftoning technique with a further restriction that the whole image is divided into n-tuples of neighboring pixels, wherein each pixel in the n-tuple has a unique designation N. The term n-tuple as used herein means that the image is divided into non-overlapping groups of n pixels. Within each n-tuple combinations of available printer colorants are printed to produce the appearance of the desired output color. The number n is determined by the maximum number of printer colorants and no colorant that will be combined in a neighborhood to produce a desired output color.

For example, if colorants capable of producing black and the three additive primary colors red, green and blue are provided in the printer, and the print medium (e.g. paper) is white, most of the colors commonly produced by process color printer can be produced on an accent color printer using combinations of at most, two of the available output colors. Thus in this case, the n-tuples would have just two members which could be designated Odd and Even.

If colorant combinations other than a complete set of primaries are used, the number of colorants in a neighborhood to produce the desired output color appearance may be greater than two. For example if a combination of additive and subtractive primaries (e.g. red, yellow and blue) are used the n-tuple may have three members. The color green in this example would be produced by two yellow pixels and one blue pixel in a 3-tuple.

Figure 1:
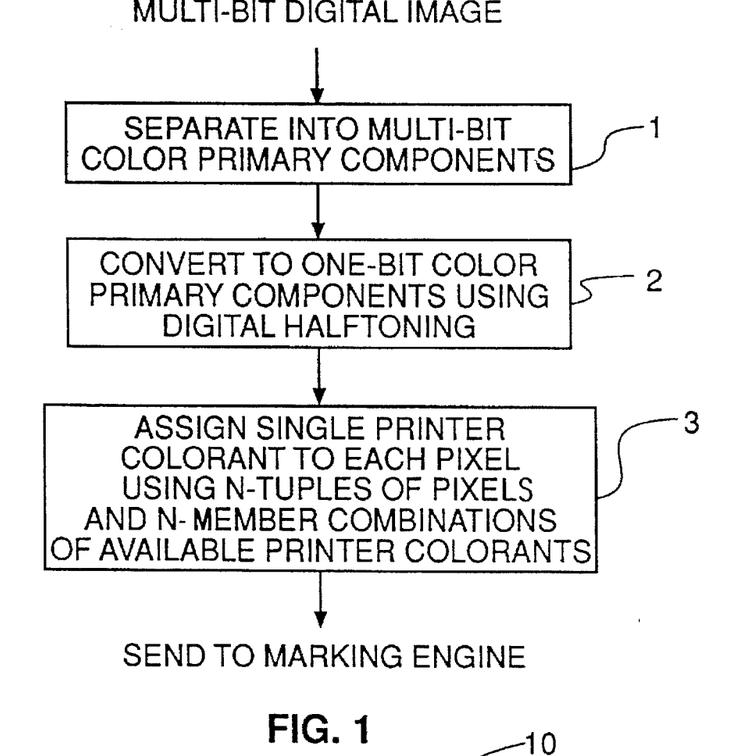
FIG. 1 is a flow chart illustrating the general method of the present invention.

FIG. 1 is a flow chart illustrating the general method of the present invention. As shown in FIG. 1, the multi-bit digital image is first separated (1) into three multi-bit color primary components. Each multi-bit color primary component is then converted (2) to a 1-bit color primary component using any known digital color image halftoning technique such as dithering or error diffusion. Finally, a single printer colorant is assigned (3) to each pixel of the image using n-tuples of pixels and N-member combinations of available printer colorants and no colorant as described above.

Figure 2:
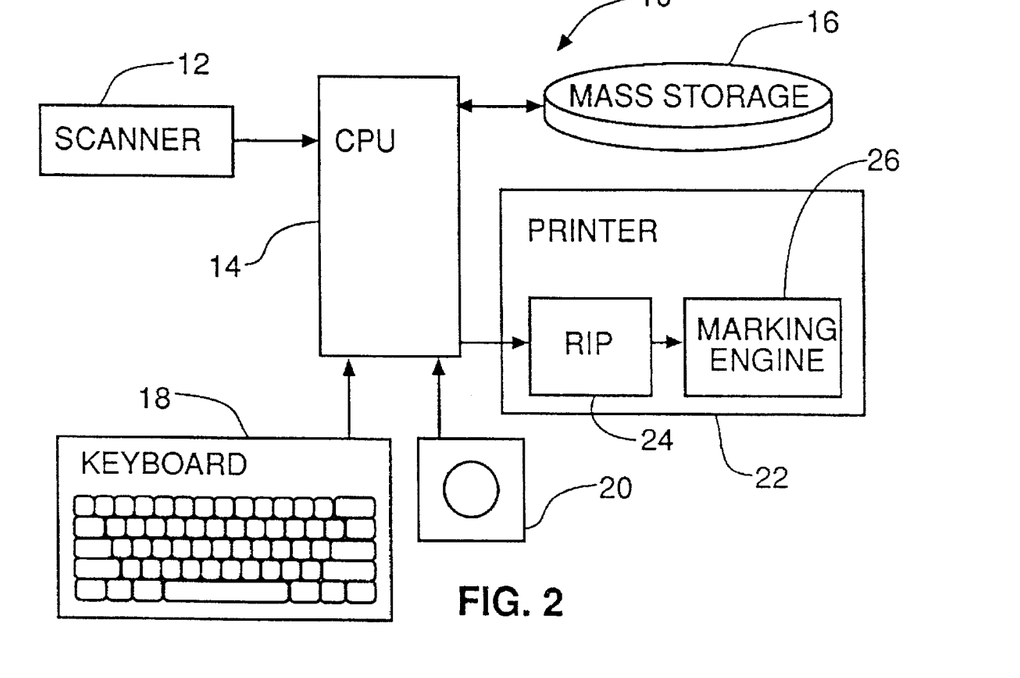
FIG. 2 is a block diagram of the printing system capable of employing the method of the present invention.

Referring now to FIG. 2, a specific example of a system useful for practicing the method of the present invention, for example a system for printing documents having color images, is generally designated 10. The system includes a scanner 12 for scanning color photographic prints to produce a digital image file. The scanner 12 may be for example an Epson 800-C™ color scanner that produces 24 bit color digital image files from color photographic prints. The scanner 12 is connected to a central processing unit (CPU) 14, for example a Sun Microsystems Sparcstation 2™ workstation running a desktop publishing application such as Framemaker from Frame Technology on the Sun Solaris™ operating system. The system 10 includes a mass storage device 16, such as a magnetic disk drive for storing the data files generated the desktop publishing application. Operator interface devices such as a keyboard 18 and mouse 20 are connected to the CPU 14 to allow an operator to control the system. A printer 22, such as a Kodak ImageSource 70 Copier/Printer is connected to the CPU 14 for printing documents containing color images generated by the application. The printer 22 includes a programmable raster image processor (RIP) 24 connected to drive a color marking engine 26. The RIP 24 converts the page description language commands generated by the desktop publishing application to commands for driving the color marking engine 26. The color marking engine is provided with red, green, blue and black toners, and is capable of applying any one of the toners to a given pixel in the output image, but is not capable of overlapping the toners.

The page description language generated by the desktop publishing application defines each output pixel in terms of 24-bit color components (8-bits red, 8-bits green and 8-bits blue) in a page description language (e.g. PostScript or PCL). The RIP 24 interprets the page description language into rasterized 24-bit color components as is known in the prior art. The RIP 24 then converts the rasterized 24-bit color components to 3-bit additive color plus 1-bit black components (1-bit red, 1-bit green, 1-bit blue, and 1-bit black) for driving the color marking engine 26.

Figure 3:
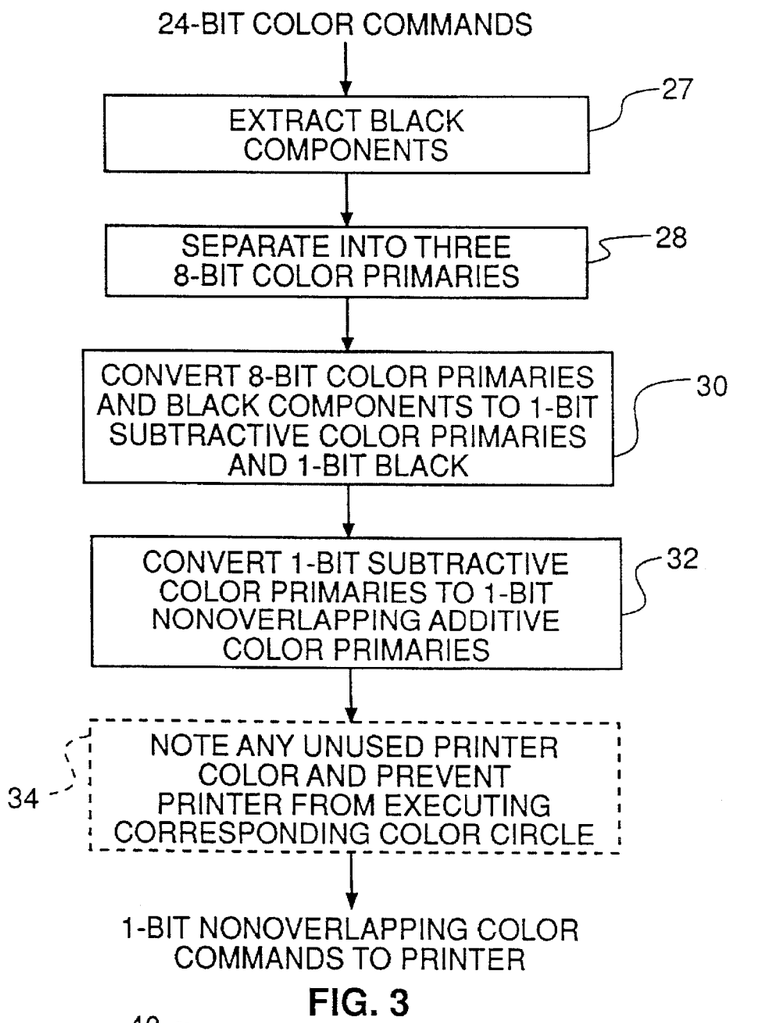
FIG. 3 is a block diagram showing the major steps used in processing a digital image according to the present invention.

As shown in FIG. 3, the RIP 24 processes the rasterized 24-bit color components by first extracting an 8-bit black component (27). This is done by a process known in the art as "under color removal", wherein the color components of a pixel are examined and a minimum value common to all of the color components is assigned to black and subtracted from the remaining color components. In the prior art, it is known to remove all or some percentage of black. According to the preferred embodiment of the present invention, 100% of the black is removed. Next, the remaining primary colorants are converted (28) into three 8-bit primary color components. The RIP 24 then converts (30) the 8-bit primary color components and the 8-bit black component to 1-bit subtractive color primary components as described in detail below. The RIP 24 then (32) converts the 1-bit subtractive color primary components plus black to non-overlapping 1-bit additive color primary components plus black as described in further detail below.

Optionally, to increase printing speed, the RIP 24 may be programmed to detect (34) an unused printer toner for a page, and command the printer to skip the printing process for the unused color. Finally, the RIP 24 sends the non-overlapping 1-bit color components to the marking engine to print the color image.

Figure 4:
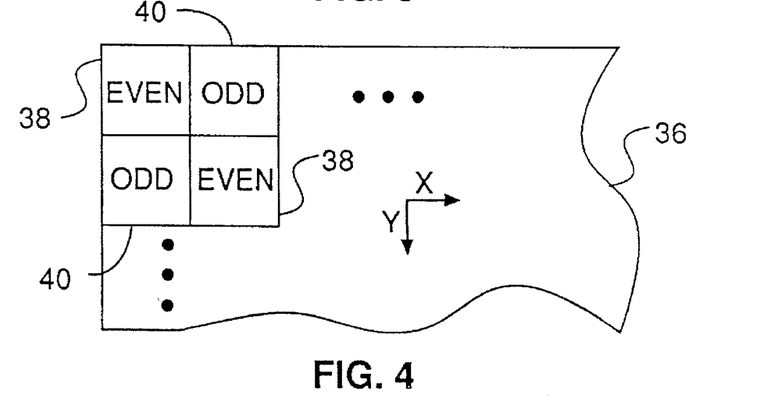
FIG. 4 is a diagram representing a portion of a digital image useful in describing the step of separating and converting the digital image into 1-bit subtractive color primary separations.

To convert the 8-bit primary color components plus the 8-bit black component to 1-bit subtractive color primary components plus 1-bit black according to the present invention, first consider the whole page 36 as being divided up into 2-tuples having Even pixels 38 and Odd pixels 40, as illustrated in FIG. 4. This division of the pixels is chosen so that neighboring pixels will be treated with identical or nearly identical threshold values as described below. Although the example shows pairs of neighboring adjacent diagonal pixels being identified, other schemes such as pairs of vertically or horizontally adjacent neighbors, or nearly adjacent neighbors (e.g. pairs of pixels separated by one or several other pixels) can be employed. The diagonally adjacent scheme has the benefit that the human visual response is less acute for diagonal detail, and therefore pixel patterns resulting from the method of the present invention are less visible to the human viewer.

Figure 5:
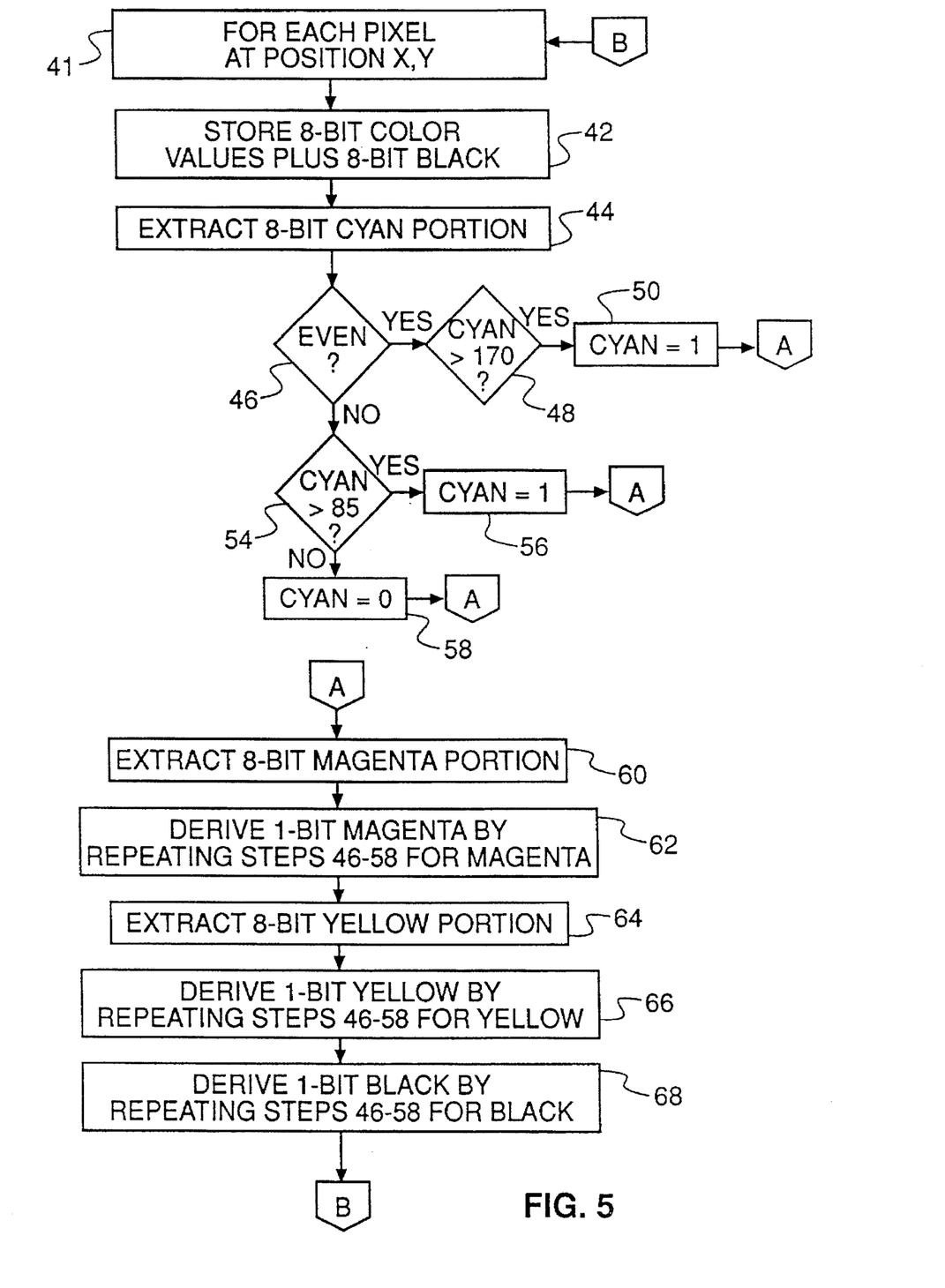
FIG. 5 is a flow chart showing an example of the details of the method used to separate and convert the digital image from multi-bit to one bit subtractive color primaries.

Referring now to FIG. 5, each pixel on the page 36 is processed as follows (41). The three 8-bit primary color values for the pixel at a particular X,Y location are temporarily stored (42). An 8-bit Cyan portion is extracted (44) from the temporarily stored color values by converting the temporarily stored primary color values to C,M,Y space and extracting the Cyan component. The particular conversion of the three 8-bit primary color values depends on their color space, and will be trivial if the color space is already C,M,Y. Otherwise, any known appropriate color space transformation may be applied to the primary color values to convert them to C,M,Y values.

A test is made (46) to determine if the pixel is an Even pixel (see FIG. 3). If the pixel is an Even pixel, a test (48) is made to determine if the Cyan value is greater than some upper threshold, e.g. ⅔ of the maximum possible Cyan value (i.e. 170 out of a possible 255). If the Cyan value is greater than ⅔ of the maximum, the Cyan bit is set to 1 (50); if not, it is set to 0 (52). If the pixel is Odd, a test (54) is made to determine if the Cyan value is greater than some lower threshold, e.g. ⅓ of the maximum possible Cyan value (i.e. 85 out of a possible 255). If the Cyan value is greater than ⅓ of the maximum, the Cyan bit is set to 1 (56); if not, it is set to 0 (58). The actual threshold values are not critical to the performance of the present invention, but are selected to produce the most pleasing gray scale appearance of the output image. Experiments have shown that although other threshold values will produce more pleasing results for some images, ⅔ and ⅓ work the best for a large population of images.

Next, an 8-bit Magenta portion of the temporarily stored color values is extracted (60), and a Magenta bit is assigned (62) by repeating the steps (46)–(58) for Magenta. Next, an 8-bit Yellow portion of the temporarily stored color values is extracted (64), and a Yellow bit is assigned (66) by repeating the steps (46)–(58) for Yellow. Finally, a Black bit is assigned (68) by repeating the steps (46)–(58) for Black.

Figure 6:
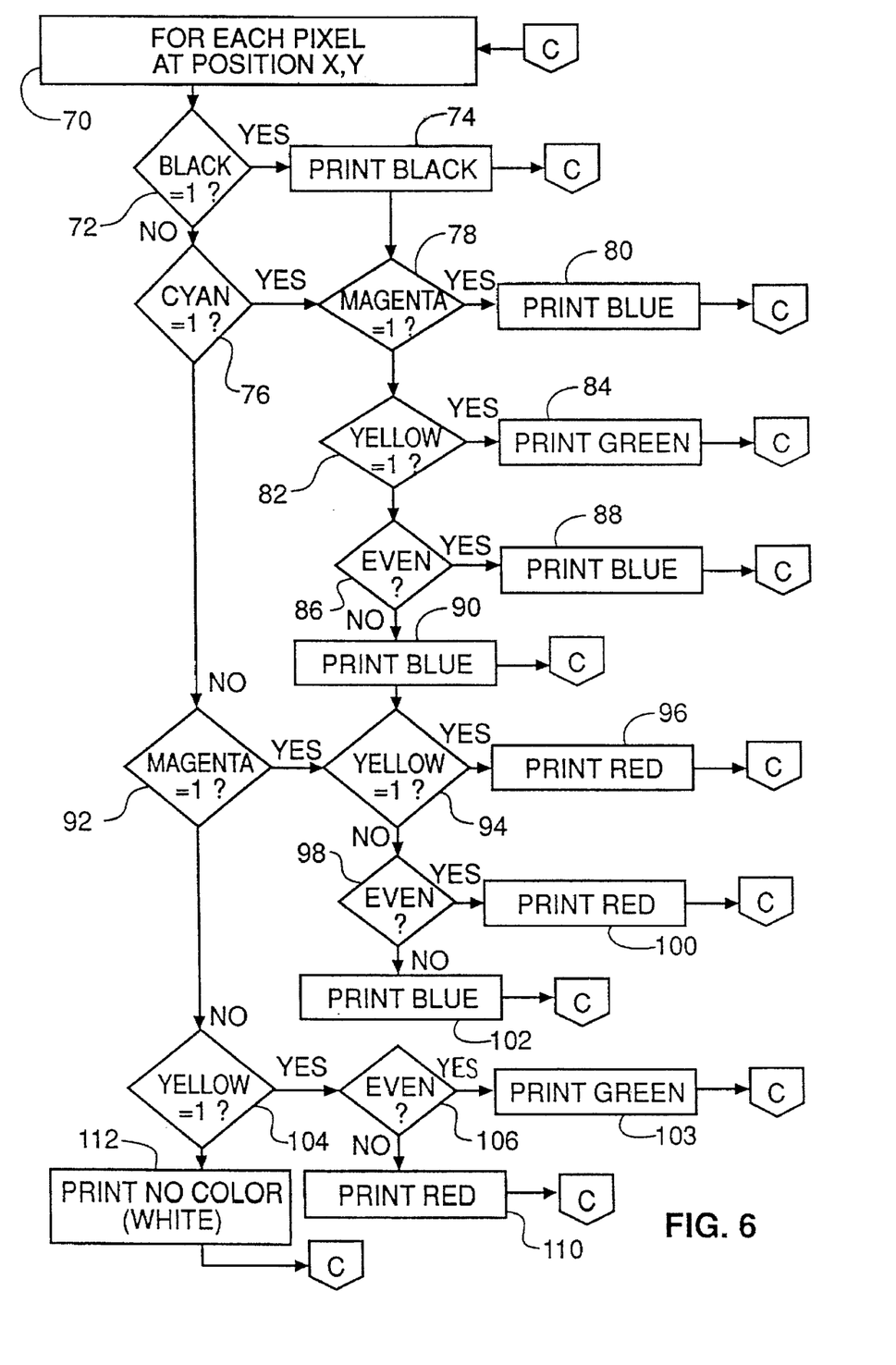
FIG. 6 is a flow chart showing an example of the details needed to assign printer colorants.

Referring now to FIG. 6, the process of assigning 1-bit non-overlapping additive color primary values to each pixel on the output page will be described. As was the case with the input image described in FIG. 4, each pixel on the output page is assigned to be either Odd or Even corresponding with the assignment of pixels on the input page image 36. For each pixel on the page at position (X,Y) (70), a test is made (72) to see if the Black bit is a 1. If so, the output pixel is assigned a Black value of one (1) (74), and the additive primaries Red, Green, and Blue are all set to zero (0) and the process continues with the next pixel. A one indicates that the corresponding toner will be printed and zero indicates that it will not be printed. If the Black bit is not a one, a test is made (76) to determine if the Cyan bit is a one (1). If so, a test is made (78) to determine if the Magenta bit is a one (1) and if it is, the output pixel is assigned (80) a Blue value of one (1) and the other additive primaries, including black are set to zero (0) and the process continues with the next pixel. If the Magenta bit is a zero (0), a test is made (82) to determine if the Yellow bit is a one (1), and if so, the Green component of the output pixel is set to one (1) and the other components are set to zero (0) 84 and the process continues with the next pixel. If the Yellow bit is zero (0), a test is made (86) to see if the pixel is an Even pixel. If the pixel is even, the Blue component of output pixel is set to one (1) (88) and the other components are set to zero (0) and the process continues with the next pixel. If the pixel is Odd, the Green component of the output pixel is set to one (1) (90) and the other components are set to zero (0) and the process continues with the next pixel. Since blue and green when viewed next to each other will appear cyan, this portion of the process results in reproducing a very close approximation of the desired color of the output image.

If the Cyan bit of the pixel was zero (0), a test is made (92) to determine if the Magenta bit of the pixel is a one (1). If so, a test is made (94) to determine if the Yellow bit is a one (1),a and if so, the output pixel is set to Red (96) and the process continues with the next pixel. If the Yellow bit is a zero, a test is made (98) to determine if the pixel is Even, and if so the output is set to Red (100) and the process continues with the next pixel. If the pixel is Odd, the output is set to Blue (102) and the process continues with the next pixel. Since red and blue when viewed next to each other will appear magenta, this portion of the process results in reproducing a very close approximation of the desired color of the output image.

If the Magenta bit of the pixel was zero (0), a test is made (104) to determine if the Yellow bit is a one (1). If it is, a test is made (106) to see if the pixel is Even, and if so, the output pixel is set to Green (108) and the process continues with the next pixel. If the pixel is Odd, the output is set to Red (110) and the process continues with the next pixel. Since red and green when viewed next to each other will appear yellow, this portion of the process results in reproducing a very close approximation of the desired color of the output image.

Finally, if all the bits (Cyan, Magenta, Yellow and Black) were zero (0), the output pixel is made white (112), assuming that the printing medium is white.

The processing steps shown in FIG. 6 can be summarized in Table 1 below.

TABLE 1

| Cyan | Magenta | Yellow | Black | Output Even | Output Odd |
| --- | --- | --- | --- | --- | --- |
| x* | x* | x* | 1 | Black | Black |
| 1 | 0 | 0 | 0 | Blue | Green |
| 0 | 1 | 0 | 0 | Red | Blue |
| 0 | 0 | 1 | 0 | Green | Red |
| 1 | 1 | 0 | 0 | Blue | Blue |
| 0 | 1 | 1 | 0 | Red | Red |
| 1 | 0 | 1 | 0 | Green | Green |
| 0 | 0 | 0 | 0 | No Color | No Color |

*x indicates either a 0 or a 1

In the example shown in Table 1, the n-tuple is a 2-tuple with pixels designated as Even or Odd. The N members, where N=2, of the combinations of printer colorants and no colorant are indicated in the two right-hand columns of each row.

It should be noted that the order of processing the 1-bit Cyan, Magenta and Yellow subtractive primaries described in FIG. 6 is not important, and other processing orders, with appropriate modifications to account for the fact that preceding colors have already been tested and determined to be zero (0).

The method of the present invention was employed to process 24-bit full color digital images produced by scanning photographic film and printing the processed images on a 4 color electrophotgraphic printer having red, green, blue and black toners. The results were generally acceptable for office and business applications and represented a marked improvement over prior art accent color images.

In an example where the printer colorants are Red, Yellow, Blue and Black, the n-tuples will have 3 members and the corresponding assignments of printer colorants would appear as shown in Table 2.

TABLE 2

| Cyan | Magenta | Yellow | Black | N = 1 | N = 2 | N = 3 |
| --- | --- | --- | --- | --- | --- | --- |
| x* | x* | x* | 1 | Black | Black | Black |
| 1 | 0 | 0 | 0 | Blue | Blue | Yellow |
| 0 | 1 | 0 | 0 | Red | No Color | Blue |
| 0 | 0 | 1 | 0 | Yellow | Yellow | Yellow |
| 1 | 1 | 0 | 0 | Blue | Blue | Blue |
| 0 | 1 | 1 | 0 | Red | Red | Red |
| 1 | 0 | 1 | 0 | Yellow | Yellow | Blue |
| 0 | 0 | 0 | 0 | No Color | No Color | No Color |

*x indicates either a 0 or 1

A listing of a computer program written in the C language running on a Sun work station for performing the method of the present invention is included as Appendix A.

The invention has been described with reference to a preferred embodiment. However, it will be appreciated that variations and modifications can be effected by a person of ordinary skill in the art without departing from the scope of the invention.

Appendix_A

```
1  /*****************************************************************
2   *          COPYRIGHT EASTMAN KODAK COMPANY, 1995
3   *                 ALL RIGHTS RESERVED
4   *
5   * SCCS Release: %W%      %r 1.4+  w%
6   * Newest Delta: %H%      %T%
7   *
8   * Revision History:
9   *    Author    Date         Description
10  *    ------    --------     -----------
11  *R  05/09/95   emh          S: add RYB ; Tue May  9 08:05:40 EDT 1995 agate
12  *   03/15/95   emh          S: ; Wed Mar 15 16:09:02 EST 1995 agate
13  *   03/15/95   emh          S: ; Wed Mar 15 15:44:10 EST 1995 agate
14  *   NEW
15  *****************************************************************/
16  static char     sccs_what[] = "@(#) @1.4+ accent.c: %W% %I% %G% COPYRIGHT 1995 KODAK
17
18  #include <stdio.h>
19
20  #define SCCS_SIGNED_OUT 1
21
22  #ifdef SCCS_SIGNED_OUT
23  #endif
24
25  /*****************************************************************
26   *
27   ** FUNCTION NAME: main
28   *
29   *  RETURN VALUE:  none
30   *
31   *  FORMAL ARGUMENTS:
32   *
33   *  IMPLICIT INPUTS/OUTPUTS:
34   *      read cmyk packed pixels (4 bits each) from input
35   *      write out sun raster formatted data suitable for display on a CRT
36   *
37   *  DESCRIPTION:
38   *
39   *  REVISION HISTORY:
40   *
41   *  DATE        AUTHOR       DESCRIPTION OF CHANGE
42   *  ====        ======       =====================
43   *
44  *****************************************************************/
45  main(argc, argv)
46  int          argc;
47  char         *argv[];
48  {
49      int             cl;
50
51      cl = sccs_what[0];
52
53      if (argc > 1 && argv[1][0] == '-')
54          switch (argv[1][1])
55          {
56
57          case 'C':
58                                                              /* Processing array */
59      /*  convert_cmyk_chunky(argv[1][2],1);                   /* 4x2 */
60          convert_cmyk_chunky(argv[1][2],-1);                  /* 1x2 */
61          exit(0);
62
63          case 'c':
64              convert_cmyk_chunky(argv[1][2],0);               /* 2x2 */
65              exit(0);
66
```

Appendix_A

```
67       case 'h':
68           printf(" This program supports sun raster files");
69           printf("                OUTPUT IS stdout\n");
70           printf(" Valid options are:\n");
71           printf("   -c?   rgb332 from CMYK 1 bits chunky [2x2]\n");
72           printf("   -C?   rgb332 from CMYK 1 bits chunky [4x2]\n");
73           exit(0);
74
75       default:
76           break;
77       }
78
79 end_main:
80     fprintf(stderr, "option not supported yet - 0x%x\n", argv[1][1]);
81     exit(1);
82 }
83
84 /*****************************************************************/
85 /*****************************************************************/
86 /*****************************************************************/
87 /* NOTE: not all possible combinations of printer colorants are shown
88  * For n-tuples where n=2 provide the mapping of EVEN/ODD pixels
89  *     ---------------
90  * 2x2 |EVEN | ODD |
91  *     |-----------|
92  *     |ODD  | EVEN|
93  *     ---------------
94  *              EVEN, ODD,  EVEN, ODD          printer colors
95 *****************************************************************/
96 static char accent_c_rgb[] = {0x02, 0x1c, 0x1c, 0x02};    /* RGBK */
97 static char accent_m_rgb[] = {0x02, 0xe0, 0xe0, 0x02};
98 static char accent_y_rgb[] = {0xe0, 0x1c, 0x1c, 0xe0};
99
100 static char accent_r_rgb[] = {0xe0, 0xe0, 0xe0, 0xe0};   /* RGBK */
101 static char accent_g_rgb[] = {0x1c, 0x1c, 0x1c, 0x1c};
102 static char accent_b_rgb[] = {0x02, 0x02, 0x02, 0x02};
103
104
105 static char accent_Y_y[]  = {0xfc, 0xfc, 0xfc, 0xfc};    /* YK */
106 static char accent_Y_k[]  = {0x00, 0xff, 0xff, 0x00};
107
108 static char accent_y_y[]  = {0xfc, 0xfc, 0xfc, 0xfc};    /* YK */
109 static char accent_y_c[]  = {0xfc, 0xff, 0xff, 0xff};
110 static char accent_y_m[]  = {0xfc, 0xff, 0xff, 0xfc};
111 static char accent_y_r[]  = {0xfc, 0x00, 0x00, 0xfc};
112 static char accent_y_g[]  = {0xfc, 0xff, 0x00, 0xfc};
113 static char accent_y_b[]  = {0xfc, 0xfc, 0x00, 0xfc};
114
115 static char accent_B_b[]  = {0x02, 0x02, 0x02, 0x02};    /* Blue K */
116 static char accent_B_k[]  = {0x00, 0xff, 0xff, 0x00};
117
118 static char accent_b_y[]  = {0x02, 0x00, 0xff, 0x02};    /* Blue K */
119 static char accent_b_c[]  = {0x02, 0x00, 0xff, 0x00};
120 static char accent_b_m[]  = {0x02, 0xff, 0x02, 0x02};
121 static char accent_b_r[]  = {0x02, 0xff, 0xff, 0xff};
122 static char accent_b_g[]  = {0x02, 0xff, 0xff, 0x02};
123 static char accent_b_b[]  = {0x02, 0x02, 0x02, 0x02};
124
125 static char accent_D_g[]  = {0x1c, 0x1c, 0x1c, 0x1c};    /* GY */
126 static char accent_D_y[]  = {0xfc, 0xfc, 0xfc, 0xfc};
127 static char accent_D_k[]  = {0x00, 0xff, 0xff, 0x00};
128
129 static char accent_d_y[]  = {0xfc, 0xfc, 0xfc, 0xfc};    /* GY */
130 static char accent_d_c[]  = {0x1c, 0xff, 0xff, 0x1c};
131 static char accent_d_m[]  = {0x1c, 0xff, 0xff, 0xfc};
132 static char accent_d_r[]  = {0xfc, 0xff, 0xff, 0xfc};
```

Appendix_A

```
133 static char accent_d_g[]   = {0x1c, 0x1c, 0x1c, 0x1c};
134 static char accent_d_b[]   = {0x1c, 0x00, 0xff, 0x1c};
135
136 static char accent_E_g[]   = {0x1c, 0x1c, 0x1c, 0x1c};      /* GB */
137 static char accent_E_b[]   = {0x02, 0x02, 0x02, 0x02};
138 static char accent_E_c[]   = {0x1c, 0x02, 0x02, 0x1c};
139 static char accent_E_k[]   = {0x00, 0xff, 0xff, 0x00};
140
141 static char accent_e_y[]   = {0x1c, 0xff, 0xff, 0x1c};      /* GB */
142 static char accent_e_c[]   = {0x1c, 0x02, 0x02, 0x1c};
143 static char accent_e_m[]   = {0x1c, 0xff, 0xff, 0x02};
144 static char accent_e_r[]   = {0x1c, 0x00, 0xff, 0x02};
145 static char accent_e_g[]   = {0x1c, 0x1c, 0x1c, 0x1c};
146 static char accent_e_b[]   = {0x02, 0x02, 0x02, 0x02};
147
148 static char accent_F_g[]   = {0x1c, 0x1c, 0x1c, 0x1c};      /* GBY */
149 static char accent_F_b[]   = {0x02, 0x02, 0x02, 0x02};
150 static char accent_F_c[]   = {0x1c, 0x02, 0x02, 0x1c};
151 static char accent_F_y[]   = {0xfc, 0xfc, 0xfc, 0xfc};
152 static char accent_F_k[]   = {0x00, 0xff, 0xff, 0x00};
153
154 static char accent_f_y[]   = {0xfc, 0xfc, 0xfc, 0xfc};      /* GBY */
155 static char accent_f_c[]   = {0x1c, 0x02, 0x02, 0x1c};
156 static char accent_f_m[]   = {0x1c, 0xff, 0xff, 0x02};
157 static char accent_f_r[]   = {0xfc, 0xfc, 0x00, 0x02};
158 static char accent_f_g[]   = {0x1c, 0x1c, 0x1c, 0x1c};
159 static char accent_f_b[]   = {0x02, 0x02, 0x02, 0x02};
160
161 static char accent_G_r[]   = {0xe0, 0xe0, 0xe0, 0xe0};      /* RBYK */
162 static char accent_G_b[]   = {0x02, 0x02, 0x02, 0x02};
163 static char accent_G_m[]   = {0xe0, 0x02, 0x02, 0xe0};
164 static char accent_G_y[]   = {0xfc, 0xfc, 0xfc, 0xfc};
165 static char accent_G_k[]   = {0x00, 0xff, 0xff, 0x00};
166
167 static char accent_g_y[]   = {0xfc, 0xfc, 0xfc, 0xfc};      /* RGBYK */
168 static char accent_g_c[]   = {0x02, 0x02, 0x02, 0xfc};
169 static char accent_g_m[]   = {0xe0, 0x02, 0x02, 0xe0};
170 static char accent_g_r[]   = {0xe0, 0xe0, 0xe0, 0xe0};
171 static char accent_g_g[]   = {0x02, 0xfc, 0xfc, 0x02};
172 static char accent_g_b[]   = {0x02, 0x02, 0x02, 0x02};
173
174
175
176 static char accent_64[64];
177
178
179 /******************************************************************
180  *
181  ** FUNCTION NAME:  lfn_accent_color
182  *
183  *  RETURN VALUE:  none
184  *
185  *  FORMAL ARGUMENTS:
186  *      cmd_char holds a character which tells which toners to process
187  *
188  *  IMPLICIT INPUTS/OUTPUTS:
189  *
190  *  DESCRIPTION:
191  *
192  *  REVISION HISTORY:
193  *
194  *  DATE        AUTHOR      DESCRIPTION OF CHANGE
195  *  ====        ======      =====================
196  *
197  ******************************************************************/
198 lfn_accent_color(cmd_char)
```

Appendix_A

```
199  char       cmd_char;
200  {
201     char       rgb332;
202     int        il,xy_pos;
203     char       *accent_c, *accent_m, *accent_y;
204     char       *accent_r, *accent_g, *accent_b;
205
206     /******************************************************/
207     /* map the correct printer toners                     */
208     /******************************************************/
209     switch (cmd_char)
210     {
211        case 'g':   accent_y = accent_g_y;    /* rby for all colors */
212                    accent_m = accent_g_m;
213                    accent_c = accent_g_c;
214                    accent_r = accent_g_r;
215                    accent_g = accent_g_g;
216                    accent_b = accent_g_b;
217                    break;
218        case 'G':   accent_y = accent_G_y;    /* rby only */
219                    accent_m = accent_G_m;
220                    accent_c = accent_G_k;
221                    accent_r = accent_G_r;
222                    accent_g = accent_G_k;
223                    accent_b = accent_G_b;
224                    break;
225        case 'f':   accent_y = accent_f_y;    /* gby for all colors */
226                    accent_m = accent_f_m;
227                    accent_c = accent_f_c;
228                    accent_r = accent_f_r;
229                    accent_g = accent_f_g;
230                    accent_b = accent_f_b;
231                    break;
232        case 'F':   accent_y = accent_F_y;    /* gby only */
233                    accent_m = accent_F_k;
234                    accent_c = accent_F_c;
235                    accent_r = accent_F_k;
236                    accent_g = accent_F_g;
237                    accent_b = accent_F_b;
238                    break;
239        case 'e':   accent_y = accent_e_y;    /* gb for all colors */
240                    accent_m = accent_e_m;
241                    accent_c = accent_e_c;
242                    accent_r = accent_e_r;
243                    accent_g = accent_e_g;
244                    accent_b = accent_e_b;
245                    break;
246        case 'E':   accent_y = accent_E_k;    /* gb only */
247                    accent_m = accent_E_k;
248                    accent_c = accent_E_c;
249                    accent_r = accent_E_k;
250                    accent_g = accent_E_g;
251                    accent_b = accent_E_b;
252                    break;
253        case 'd':   accent_y = accent_d_y;    /* gy for all colors */
254                    accent_m = accent_d_m;
255                    accent_c = accent_d_c;
256                    accent_r = accent_d_r;
257                    accent_g = accent_d_g;
258                    accent_b = accent_d_b;
259                    break;
260        case 'D':   accent_y = accent_D_y;    /* gy only */
261                    accent_m = accent_D_k;
262                    accent_c = accent_D_k;
263                    accent_r = accent_D_k;
264                    accent_g = accent_D_g;
```

Appendix_A

```
265                    accent_b = accent_D_k;
266                    break;
267       case 'b':    accent_y = accent_b_y;
268                    accent_m = accent_b_m;
269                    accent_c = accent_b_c;
270                    accent_r = accent_b_r;
271                    accent_g = accent_b_g;
272                    accent_b = accent_b_b;
273                    break;
274       case 'B':    accent_y = accent_B_k;
275                    accent_m = accent_B_k;
276                    accent_c = accent_B_k;
277                    accent_r = accent_B_k;
278                    accent_g = accent_B_k;
279                    accent_b = accent_B_b;
280                    break;
281       case 'y':    accent_y = accent_y_y;
282                    accent_m = accent_y_m;
283                    accent_c = accent_y_c;
284                    accent_r = accent_y_r;
285                    accent_g = accent_y_g;
286                    accent_b = accent_y_b;
287                    break;
288       case 'Y':    accent_y = accent_Y_y;
289                    accent_m = accent_Y_k;
290                    accent_c = accent_Y_k;
291                    accent_r = accent_Y_k;
292                    accent_g = accent_Y_k;
293                    accent_b = accent_Y_k;
294                    break;
295       default:
296       case 'A':    accent_y = accent_y_rgb;        /* rgb K */
297                    accent_m = accent_m_rgb;
298                    accent_c = accent_c_rgb;
299                    accent_r = accent_r_rgb;
300                    accent_g = accent_g_rgb;
301                    accent_b = accent_b_rgb;
302                    break;
303       }
304
305   /******************************************************************/
306   /* Build the look up table needed to process the raster date   */
307   /******************************************************************/
308   for (il=0 ; il<64 ; il++)
309   {
310       xy_pos = il>>4;                              /* 2x2 */
311       switch (il&0x0f)
312       {
313       case 0:      rgb332 = 0xff; break;            /* white */
314       default:     rgb332 = 0x00; break;            /* black */
315       case 2:      rgb332 = accent_y[xy_pos]; break; /* yellow */
316       case 4:      rgb332 = accent_m[xy_pos]; break; /* magenta */
317       case 6:      rgb332 = accent_r[xy_pos]; break; /* red */
318       case 8:      rgb332 = accent_c[xy_pos]; break; /* cyan */
319       case 10:     rgb332 = accent_g[xy_pos]; break; /* green */
320       case 12:     rgb332 = accent_b[xy_pos]; break; /* blue */
321       }
322       accent_64[il] = rgb332;
323   }
324  }
325
326  /***********************************************************************
327   *
328   ** FUNCTION NAME:    convert_cmyk_chunky
329   *
330   *  RETURN VALUE:     none
```

Appendix_A

```
331  *
332  *   FORMAL ARGUMENTS:
333  *       cmd_char holds a character which tells which toners to process
334  *       x_shift determines the size and shape of the n-tuple mapping grid
335  *
336  *   IMPLICIT INPUTS/OUTPUTS:
337  *
338  *   DESCRIPTION:
339  *
340  *   REVISION HISTORY:
341  *
342  *   DATE        AUTHOR      DESCRIPTION OF CHANGE
343  *   ====        ======      =====================
344  *
345  *******************************************************************/
346  convert_cmyk_chunky(cmd_char,x_shift)
347  char        cmd_char;
348  int         x_shift;
349  {
350      int             i1;
351      int             bits_per_pel;
352      int             c1[4];
353      int             char1;
354      int             x1,y1,xy_pos;
355      char            c8, m8, y8, k8;
356      char            rgb332;
357
358      bits_per_pel = 1;
359      if (cmd_char>='0' && cmd_char<='9')
360          bits_per_pel = 0x30 + cmd_char & 0x0f;
361
362      x1 = y1 = i1 = 0;
363                          /**********************************/
364                          /* Handle bits_per_pel == 1       */
365                          /**********************************/
366      if (bits_per_pel==1)
367      {
368          fprintf(stderr, "CMYK_CHUNKY: bits_per_pel=1, cmd=%c %s\n",
369              cmd_char,"assumes width=1600");
370          fprintf(stderr," cmd==1  gives RGBK toners with 2x1\n");
371          fprintf(stderr," cmd==A  gives RGBK toners with 2x2\n");
372          fprintf(stderr," cmd==Y  gives   YK toners with 2x2\n");
373          fprintf(stderr," cmd==Bb gives   BK toners with 2x2\n");
374          fprintf(stderr," cmd==Dd gives  GYK toners with 2x2\n");
375          fprintf(stderr," cmd==Ee gives  GBK toners with 2x2\n");
376          fprintf(stderr," cmd==Ff gives GBYK toners with 2x2\n");
377          fprintf(stderr," cmd==Gg gives RBYK toners with 2x2\n");
378
379                              /**********************************/
380                              /* Make LUT for chosen toners    */
381                              /**********************************/
382          lfn_accent_color(cmd_char);
383
384                              /**********************************/
385                              /* Process the raster file data  */
386                              /**********************************/
387          while(1)
388          {
389              char1 = getchar(); if (char1 == EOF) break;
390
391              xy_pos = (((x1>>x_shift)&1)<<5) | ((y1&1)<<4);     /* 00XYcmyk */
392              putchar(accent_64[xy_pos+(char1>>4)]);
393              putchar(accent_64[xy_pos+(char1&0x0f)]);
394
395              x1++;
396              if (x1==1600)                   /* assume pixel width of 1600 */
                 {
```

```
                    Appendix_A
397         x1 = 0;
398         if (cmd_char!='l') y1++;
399     }
400     continue;
401 }
402 return;
403 }
404 }
405
406
```

PARTS LIST 1 separate digital image into 3 multi-bit primary components step
2 convert to 3 1-bit components step
3 assign single printer colorant to each pixel step
10 color document printing system
12 scanner
14 central processing unit
16 mass storage device
18 keyboard
20 mouse
22 accent color printer
24 raster image processor
26 color marking engine
27 8-bit black component extracting step
28 primary colorant component converting step
30 1-bit subtractive color component converting step
32 1-bit additive color component converting step
34 determine unused colorant step
36 whole page
38 Even pixel
40 Odd pixel
41 get color value at X,Y step
42 store color value step
44 extract 8-bit Cyan portion step
46 determine if Even pixel step
48 test if Cyan value greater than upper threshold
50 set Cyan bit to one step
52 set Cyan bit to zero step
54 test if Cyan value greater than lower threshold
56 set Cyan bit to one step
58 set Cyan bit to zero step
60 extract Magenta portion step
62 assign Magenta bit step
64 extract Yellow portion step
66 assign Yellow bit step
68 assign Black bit step
70 get pixel value at X,Y step
72 test if Black bit is one
72 set output to Black step
76 test if Cyan bit is one
78 test if Magenta bit is one
80 set output to Blue step
82 test if Yellow bit is one
84 set output to Green step
86 test if Even pixel
88 set output to Blue step
90 set output to Green step
92 test if Magenta bit is one
94 test if Yellow bit is one
96 set output to Red step
98 test if Even pixel
100 set output to Red step
102 set output to Blue step
104 test if Yellow bit is one
106 test if Even pixel
108 set output to Green step
110 set output to Red step
112 set output to no colorant step

I claim:

1. A multi color printing method employing a color printer capable of non-overlapping color printing using M colorants, where M is greater than two, comprising the steps of:
   a) providing a digital color image having multi-bit color pixels;
   b) separating the digital color image into three multi-bit color primary components;
   c) converting each multi-bit component into a 1-bit component using a digital halftoning technique;
   d) assigning a single printer colorant to each output image pixel based on the 1-bit color components by,
      1) dividing the image into n-tuples, each pixel in an n-tuple having a unique designation N,
      2) assigning N-member combinations of N−1 printer colorants and no colorant that appear as combinations of 1-bit color components, and
      3) setting an output to the Nth member of an N-member combination based on the corresponding combination of 1-bit color components; and
   e) printing the image using the assigned colorants.

2. The method claimed in claim 1, wherein the printer colorants are red, green, blue and black, the color primary components are cyan, magenta and yellow, and further comprising the step of removing a black component from the digital color image prior to separating the digital image into three multi-bit color primary components.

3. The method claimed in claim 2, wherein the n-tuples are 2-tuples having an odd and an even members and the assignment of the single printer colorants are made as follows:

| Cyan | Magenta | Yellow | Output Even | Output Odd |
|------|---------|--------|-------------|------------|
| 1 | 1 | 1 | Black | Black |
| 1 | 0 | 0 | Blue | Green |
| 0 | 1 | 0 | Red | Blue |
| 0 | 0 | 1 | Green | Red |
| 1 | 1 | 0 | Blue | Blue |
| 0 | 1 | 1 | Red | Red |
| 1 | 0 | 1 | Green | Green |
| 0 | 0 | 0 | No Color | No Color. |

4. A multi color printing method employing a color printer capable of non-overlapping color printing using M non-black colorants and a black colorant, where M is one or more, comprising the steps of:
   a) providing a digital color image having multi-bit color pixels;
   b) separating the digital color image into three multi-bit color primary components and one multi-bit black component;
   c) converting each multi-bit component into a 1-bit component by applying nearly equal threshold values to respective color components of an n-tuple of neighboring pixels each pixel in the n-tuple having a unique designation N;
   d) assigning a single printer colorant to each output image pixel based on the 1-bit color components by,
      1) if the 1-bit Black component is a one, set the output pixel to print Black,
      2) if the combination of non-black 1-bit color components appears as a color which is available as a printer colorant, set the output pixel to the available printer colorant, 3) if the combination of non-black 1-bit color components appears as a color which is not available as a printer colorant, and if the pixel is the Nth pixel in an n-tuple, set the output to the Nth member of a combination of N−1 printer colorants and no colorant which when viewed near each other appear as the combination of the non-black 1-bit color components, and 4) if all of the 1-bit color components are 0's, set the corresponding output pixel to print no colorants; and e) printing the image using the assigned colorants.

5. The method of multi color printing claimed in claim 4, wherein the primary color components are cyan, magenta and yellow, the non-black printer colorants are red, green and blue, and the n-tuple is a 2-tuple.

6. The method of multi color printing claimed in claim 5, wherein the assignment of the single printer colorants are made as follows:

| Cyan | Magenta | Yellow | Output Even | Output Odd |
|------|---------|--------|-------------|------------|
| 1 | 1 | 1 | Black | Black |
| 1 | 0 | 0 | Blue | Green |
| 0 | 1 | 0 | Red | Blue |
| 0 | 0 | 1 | Green | Red |
| 1 | 1 | 0 | Blue | Blue |
| 0 | 1 | 1 | Red | Red |
| 1 | 0 | 1 | Green | Green |
| 0 | 0 | 0 | No Color | No Color. |

7. A computer program product, comprising:

a) a computer readable storage medium, such as a memory device, a compact disc or a floppy disc, and b) a computer program stored on the disc for receiving a digital color image having multi-bit color pixels and causing a computer connected to a color printer capable of non-overlapping color printing using M colorants to print a color image, where M is greater than two, by performing the steps of:

1) separating the digital color image into three multi-bit color primary components;

2) converting each multi-bit component into a 1-bit component using a digital halftoning technique;

3) assigning a single printer colorant to each output image pixel based on the 1-bit color components by, i) dividing the image into n-tuples, each pixel in an n-tuple having a unique designation N, ii) assigning N-member combinations of N−1 printer colorants and no colorant that appear as combinations of 1-bit color components, and iii) setting an output to the Nth member of an N-member combination based on the corresponding combination of 1-bit color components; and 4) sending signals representing the assigned printer colorants to the printer for printing the image.

* * * * *